(12) United States Patent
Shen et al.

(10) Patent No.: US 11,832,272 B2
(45) Date of Patent: *Nov. 28, 2023

(54) METHOD AND DEVICE FOR DETERMINING RESOURCES AND STORAGE MEDIUM

(71) Applicant: GUANGDONG OPPO MOBILE TELECOMMUNICATIONS CORP., LTD., Guangdong (CN)

(72) Inventors: Jia Shen, Guangdong (CN); Zhi Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/550,377

(22) Filed: Dec. 14, 2021

(65) Prior Publication Data

US 2022/0104188 A1  Mar. 31, 2022

Related U.S. Application Data

(63) Continuation of application No. 16/499,060, filed as application No. PCT/CN2018/079151 on Mar. 15, 2018, now Pat. No. 11,277,824.

(Continued)

(51) Int. Cl.
*H04W 72/04* (2023.01)
*H04L 27/26* (2006.01)
(Continued)

(52) U.S. Cl.
CPC ............ *H04W 72/23* (2023.01); *H04L 5/001* (2013.01); *H04L 5/0094* (2013.01); *H04L 27/2666* (2013.01); *H04W 72/0453* (2013.01)

(58) Field of Classification Search
CPC .......... H04W 72/044; H04W 72/0453; H04W 72/23; H04L 27/2666; H04L 5/0094; H04L 5/001
See application file for complete search history.

(56) References Cited

U.S. PATENT DOCUMENTS 11,277,824 B2 *  3/2022  Shen ............... H04W 72/044
2015/0063259 A1   3/2015  Gohari et al.
(Continued)

FOREIGN PATENT DOCUMENTS

CN    104113906 A    10/2014
CN    105099634 A    11/2015
(Continued)

OTHER PUBLICATIONS

Communication under Rule 71(3) EPC for EP Application 18781267.2 dated Jun. 14, 2022. (8 pages).
(Continued)

*Primary Examiner* — Maharishi V Khirodhar
*Assistant Examiner* — Kenneth P Hunt
(74) *Attorney, Agent, or Firm* — Young Basile Hanlon & MacFarlane, P.C.

(57) ABSTRACT

Described are a method and device for determining resources and a storage medium. The method includes: transmitting, by a network device, a first message to a user equipment (UE) over a first cell, wherein the first message is used for the UE to determine a first bandwidth part (BWP) in a second cell; transmitting, by the network device, a third message over the first or second cell, wherein the third message indicates the one or more transmission resources for the UE within the first BWPs of the second cell; transmitting, by the network device, a second message to the UE over the first or second cell, wherein the second message indicates the first BWP among N second BWPs.

13 Claims, 7 Drawing Sheets

101

UE receives a first message over a first cell, wherein the first message is used for determining M first bandwidth parts (BWPs) in a second cell, M is an integer greater than or equal to 1, each of the M first BWPs is smaller than or equal to a bandwidth of the second cell; one or more transmission resources for the UE in the second cell is within at least one of the M first BWPs.

Related U.S. Application Data

(60) Provisional application No. 62/482,527, filed on Apr. 6, 2017.

(51) Int. Cl.
  *H04L 5/00* (2006.01)
  *H04W 72/23* (2023.01)
  *H04W 72/0453* (2023.01)

(56) References Cited

U.S. PATENT DOCUMENTS

| | | |
|---|---|---|
| 2016/0050647 A1 | 2/2016 | Hwang et al. |
| 2017/0245140 A1* | 8/2017 | Au .................. H04W 76/27 |

FOREIGN PATENT DOCUMENTS

| | | |
|---|---|---|
| CN | 105634666 A | 6/2016 |
| EP | 3142283 A1 | 3/2017 |
| EP | 3589047 A1 | 1/2020 |
| RU | 2556387 C2 | 7/2015 |
| WO | 2014163302 A1 | 10/2014 |
| WO | 2015031738 A1 | 3/2015 |
| WO | 2015169037 A1 | 11/2015 |
| WO | 2016198107 A1 | 12/2016 |

OTHER PUBLICATIONS

Japanese Notice of Reasons for Refusal with English Translation for JP Application 2019552578 dated May 24, 2022. (8 pages).
Extended European Search Report for EP Application 22195461.3 dated Nov. 8, 2022. (13 pages).
Canadian Third Examination Report for CA Application 3058210 dated Oct. 18, 2022. (4 pages).
Japanese Notice of Reasons for Refusal with English Translation for JP Application 2019552578 dated Aug. 26, 2022. (6 pages).
3GPP TSG RAN WG1 Meeting 90bis; R1-1718050 Prague, CZ, Oct. 9-13, 2017.
3GPP TSG RAN WG1 Meeting NR#3 R1-1715692; Nagoya, Japan, Sep. 18-21, 2017.
3GPP TSG RAN WGI Meeting #88bis R1-1705069; Spokane, USA, Apr. 3-7, 2017.
3GPP TSG RAN WG1 Meeting #88bis; R1-1704196; Spokane, USA, Apr. 3-7, 2017.
European Search Report for European Application No. 18781267.2 dated Feb. 28, 2020.
3GPP TSG RAN WG1 Meeting #88bis; R1-1704172; Spokane, USA, Apr. 3-7, 2017.
3GPP TSG RAN WGI Meeting #88bis; Spokane, USA, Apr. 3-7, 2017; RI-1704195.
Chile First Office Action with English Translation for CL Application 2019-002708 dated Oct. 20, 2020.
Communication pursuant to Article 94(3) EPC Examination for EP Application 18781267.2 dated Dec. 15, 2020.
China First Office Action with English Translation for CN Application 201911329338.0 dated Nov. 3, 2020.
Canada First Office Action for CA Application 3,058,210 dated Jan. 29, 2021. (4 pages).
Singapore First Written Opinion for SG Application 11201909086R dated Mar. 2, 2021. (7 pages).
India First Examination Report for IN Application 201917040227 dated Feb. 18, 2021. (7 pages).
Russian Office Action with English Translation for RU Application 2019134851 dated Jul. 8, 2021. (10 pages).
Communication pursuant to Article 94(3) EPC for EP Application 18781267.2 dated Jun. 8, 2021. (11 pages).
Canadian Examination Report for CA Application 3058210 dated Nov. 15, 2021. (4 pages).
3GPP TSG RAN WG1 Meeting #88 Athens, Greece, Huawei, HiSilicon, Bandwidth adaptation and scalable design in NR, R1-1701644, Feb. 13-17, 2017.
Taiwan Office Action with English Translation for TW Application 107111919 dated Nov. 2, 2021. (13 pages).
International Search Report for PCT/CN2018/079151 dated Jun. 4, 2018.
Communication pursuant to Article 94(3) EPC Examination for EP 18781267.2 dated Nov. 29, 2021.
Australian Examination Report for AU Application 2018248184 dated Feb. 18, 2022. (3 pages).
Chile Office Action with English Translation for CL Application 2019002708 dated Mar. 14, 2022. (4 pages).
Indonesia Office Action with English Translation for ID Application P00201909926 dated Feb. 15, 2022. (4 pages).
Japanese Office Action with English Translation for JP Application 2019552578 dated Feb. 15, 2022. (8 pages).
Israel Office Action with English Translation for IL Application 269299 dated Dec. 13, 2021. (7 pages).
Singapore Invitation to Respond to Written Opinion for SG Application 11201909086R dated Jan. 5, 2022. (9 pages).
Chile Second Office Action with English Translation for Chile Application No. 2019-002708 dated Jul. 20, 2021.
Mexican First Substantive Examination requirement is reported with English Translation for MX Application MX/a/2019/011360 dated Jan. 26, 2023. (6 pages).
Vietnam Substantive Examination Report with English Translation for VN Application 1201906090 dated May 30, 2023. (4 pages).
Chinese First Office Action with English Translation for CN Application 201880023528.7 dated Jul. 15, 2023. (18 pages).
Indian Hearing Notice for in Application 201917040227 dated Sep. 6, 2023. (4 pages).

* cited by examiner

| UE receives a first message over a first cell, wherein the first message is used for determining M first bandwidth parts (BWPs) in a second cell, M is an integer greater than or equal to 1, each of the M first BWPs is smaller than or equal to a bandwidth of the second cell; one or more transmission resources for the UE in the second cell is within at least one of the M first BWPs. | 101 |

FIG. 1

| a network device transmits a first message to a user equipment (UE) over a first cell, wherein the first message is used for the UE to determine M first bandwidth parts (BWPs) in a second cell, M is an integer greater than or equal to 1, each of the M first BWPs is smaller than or equal to a bandwidth of the second cell; one or more transmission resources for the UE in the second cell is within at least one of the M first BWPs | 201 |

FIG. 2

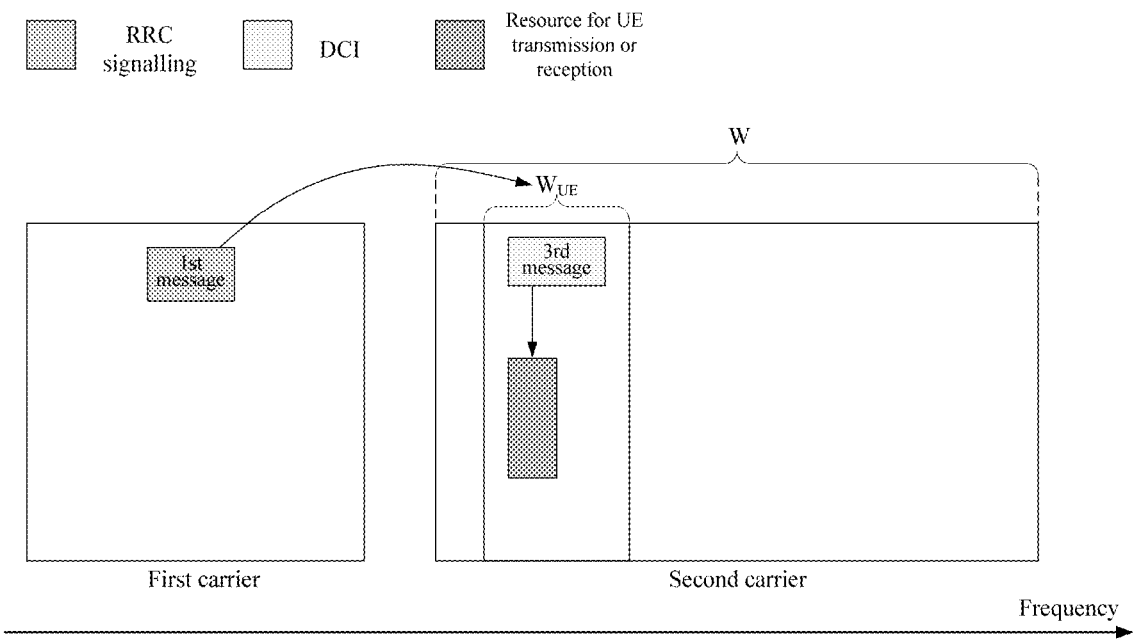

FIG. 3

METHOD AND DEVICE FOR DETERMINING RESOURCES AND STORAGE MEDIUM

CROSS-REFERENCE TO RELATED APPLICATION(S)

The present application is a continuing application of U.S. application Ser. No. 16/499,060, filed on Sep. 27, 2019, which is a 371 application of International Application No. PCT/CN2018/079151, filed on Mar. 15, 2018, which claims priority of U.S. Provisional Application No. 62/482,527, filed on Apr. 6, 2017, the contents of all of which are hereby incorporated by reference in their entireties.

TECHNICAL FIELD

The disclosure relates to wireless communications, and particularly to a method and device for determining resources and a storage medium.

BACKGROUND

In a Fourth Generation mobile communication long term evolution (4G LTE) system, a user equipment (UE) always supports a system bandwidth of a carrier, and resource allocation is performed over the whole system bandwidth.

In a Fifth Generation mobile communication new radio air interface (5G NR) system, the system bandwidth of a carrier is dramatically increased (could be up to 400 MHz). A UE may merely support or merely need to operate in a bandwidth much smaller than the system bandwidth. Therefore, resource allocation over the whole system bandwidth introduces a too large signaling overhead.

In order to solve this problem, a legacy 2-step resource assignment approach may be employed as follows. In a first step, a "bandwidth part (BWP)" which is smaller than the UE supporting bandwidth is indicated; and then the detailed Physical Resource Blocks (PRB) are indicated over the bandwidth part. And the bandwidth part is semi-statically configured by the base station, i.e., gNB.

The legacy approach as described above has the following deficiencies: carrier aggregation (CA) will also be supported in the 5G NR system. However, the legacy approach cannot support CA operation. For a UE also operating in a secondary component carrier (CC), since the UE only has the Radio Resource Control (RRC) connection with the primary CC, the UE's bandwidth part in the secondary CC cannot be configured. Hence the UE's resource in the secondary CC can still be allocated over the whole system bandwidth. This results in an excessive signaling overhead in resource allocation for the secondary CC.

SUMMARY

In view of the above, embodiments of the disclosure provide a method and device for determining resources and a storage medium.

In an aspect, a method for determining resources is provided, which includes the following operation performed by a user equipment (UE): receiving a first message over a first cell, wherein the first message is used for determining M first bandwidth parts (BWPs) in a second cell, M is an integer greater than or equal to 1, each of the M first BWPs is smaller than or equal to a bandwidth of the second cell; wherein one or more transmission resources for the UE in the second cell is within at least one of the M first BWPs.

In some embodiments of the disclosure, the M first BWPs may be indicated by the first message, and the method may further include the following operation performed by the UE: determining the M first BWPs based on the first message.

In some embodiments of the disclosure, N second BWPs may be indicated by the first message, N is an integer greater than M, each of the N second BWPs is smaller than or equal to the bandwidth of the second cell, and the method may further include the following operation performed by the UE: receiving a second message over the first or second cell, wherein the second message indicates the M first BWPs among the N second BWPs.

In some embodiments of the disclosure, the second message may be conveyed by downlink control information (DCI) or a media access control control element (MAC CE).

In some embodiments of the disclosure, the first message may be conveyed by RRC signaling or system information (SI).

In some embodiments of the disclosure, the first message may further contain information about configuration in the first BWPs, the information about configuration in the first BWPs may contain at least one of the following: subcarrier spacing (SCS); bandwidth size; frequency-domain position; time-domain structure; configurations of synchronization signal; broadcast channel; system information; or reference signal.

In some embodiments of the disclosure, the method may further include the following operation performed by the UE: receiving a third message over the first or second cell, wherein the third message indicates the one or more transmission resources for the UE within the first BWPs of the second cell.

In some embodiments of the disclosure, the third message may be conveyed by the DCI or the MAC CE.

In some embodiments of the disclosure, the bandwidth of the second cell may be a system bandwidth.

In another aspect, a method for determining resources is provided, which includes the following operation performed by a network device: transmitting a first message to a user equipment (UE) over a first cell, wherein the first message is used for the UE to determine M first bandwidth parts (BWPs) in a second cell, M is an integer greater than or equal to 1, each of the M first BWPs is smaller than or equal to a bandwidth of the second cell; wherein one or more transmission resources for the UE in the second cell is within at least one of the M first BWPs.

In some embodiments of the disclosure, the M first BWPs may be indicated by the first message.

In some embodiments of the disclosure, N second BWPs may be indicated by the first message, N is an integer greater than M, each of the N second BWPs is smaller than or equal to the bandwidth of the second cell, and the method may further include the following operation performed by the network device: transmitting a second message to the UE over the first or second cell, wherein the second message indicates the M first BWPs among the N second BWPs.

In some embodiments of the disclosure, the second message may be conveyed by downlink control information (DCI) or a media access control control element (MAC CE).

In some embodiments of the disclosure, the first message may be conveyed by RRC signaling or system information (SI).

In some embodiments of the disclosure, the first message may further contain information about configuration in the first BWPs, and the information about configuration in the first BWPs may contain at least one of the following:

subcarrier spacing (SCS); bandwidth size; frequency-domain position; time-domain structure; configurations of synchronization signal; broadcast channel; system information; or reference signal.

In some embodiments of the disclosure, the method may further include the following operation performed by the network device: transmitting a third message over the first or second cell, wherein the third message indicates the one or more transmission resources for the UE within the first BWPs of the second cell.

In some embodiments of the disclosure, the third message may be conveyed by the DCI or the MAC CE.

In some embodiments of the disclosure, the bandwidth of the second cell may be a system bandwidth.

In another aspect, a device for determining resources is provided, which includes a first reception unit, configured to receive a first message over a first cell, wherein the first message is used for determining M first bandwidth parts (BWPs) in a second cell, M is an integer greater than or equal to 1, each of the M first BWPs is smaller than or equal to a bandwidth of the second cell; wherein one or more transmission resources for the UE in the second cell is within at least one of the M first BWPs.

In some embodiments of the disclosure, the M first BWPs may be indicated by the first message, and the device may further include a determination unit, configured to determine the M first BWPs based on the first message.

In some embodiments of the disclosure, N second BWPs may be indicated by the first message, N is an integer greater than M, each of the N second BWPs is smaller than or equal to the bandwidth of the second cell, and the device may further include: a second reception unit, configured to receive a second message over the first or second cell, wherein the second message indicates the M first BWPs among the N second BWPs; and a determination unit, configured to determine the M first BWPs based on the first message and the second message.

In some embodiments of the disclosure, the second message may be conveyed by downlink control information (DCI) or a media access control control element (MAC CE).

In some embodiments of the disclosure, the first message may be conveyed by RRC signaling or system information (SI).

In some embodiments of the disclosure, the first message may further contain information about configuration in the first BWPs, wherein the information about configuration in the first BWPs contains at least one of the following: subcarrier spacing (SCS); bandwidth size; frequency-domain position; time-domain structure; configurations of synchronization signal; broadcast channel; system information; or reference signal.

In some embodiments of the disclosure, the device may further include a third reception unit, configured to receive a third message over the first or second cell, wherein the third message indicates the one or more transmission resources for the UE within the first BWPs of the second cell.

In some embodiments of the disclosure, the third message may be conveyed by the DCI or the MAC CE.

In some embodiments of the disclosure, the bandwidth of the second cell may be a system bandwidth.

In another aspect, a device for determining resources is provided, which includes a first transmission unit, configured to transmit a first message to a user equipment (UE) over a first cell, wherein the first message is used for the UE to determine M first bandwidth parts (BWPs) in a second cell, M is an integer greater than or equal to 1, each of the M first BWPs is smaller than or equal to a bandwidth of the second cell; wherein one or more transmission resources for the UE in the second cell is within at least one of the M first BWPs.

In some embodiments of the disclosure, the M first BWPs may be indicated by the first message.

In some embodiments of the disclosure, N second BWPs may be indicated by the first message, N is an integer greater than M, each of the N second BWPs is smaller than or equal to the bandwidth of the second cell, and the device may further include: a second transmission unit, configured to transmit a second message to the UE over the first or second cell, wherein the second message indicates the M first BWPs among the N second BWPs.

In some embodiments of the disclosure, the second message may be conveyed by downlink control information (DCI) or a media access control control element (MAC CE).

In some embodiments of the disclosure, the first message may be conveyed by RRC signaling or system information (SI).

In some embodiments of the disclosure, the first message may further contain information about configuration in the first BWPs, and the information about configuration in the first BWPs may contain at least one of the following: subcarrier spacing (SCS); bandwidth size; frequency-domain position; time-domain structure; configurations of synchronization signal; broadcast channel; system information; or reference signal.

In some embodiments of the disclosure, the device may further include a third transmission unit, configured to transmit a third message to the UE over the first or second cell, wherein the third message indicates the one or more transmission resources for the UE within the first BWPs of the second cell.

In some embodiments of the disclosure, the third message may be conveyed by the DCI or the MAC CE.

In some embodiments of the disclosure, the bandwidth of the second cell may be a system bandwidth.

In another aspect, a computer-readable storage medium is provided, which stores computer executable instructions, which, when executed by a processor, cause the processor to implement the method for determining resources.

With the legacy approach, a UE cannot be configured a bandwidth part in a carrier (called second carrier) other than the carrier (called first carrier) in which the UE has RRC connection. Due to the deficiency, the resource in the second carrier has to be allocated throughout the whole system bandwidth. However, in case that the UE supported bandwidth is substantially smaller than the system bandwidth (it is a common case for 5G), the resource allocation is very inefficient and consumes excessive signaling overhead.

BRIEF DESCRIPTION OF DRAWINGS

In order to describe the technical solutions of the embodiments of the disclosure more clearly, the drawings required to be used in the embodiments of the disclosure will be simply introduced below. Obviously, the drawings described below are only some embodiments of the disclosure. Other drawings may further be obtained by those skilled in the art according to these drawings without creative work.

FIG. 1 illustrates a flow chart of a method for determining resources according to some embodiments of the disclosure.

FIG. 2 illustrates a flow chart of a method for determining resources according to some embodiments of the disclosure.

FIG. 3 illustrates a resource schematic view of resource determining scheme 1 with third message from second carrier, according to some embodiments of the disclosure.

DETAILED DESCRIPTION

Figure 4:
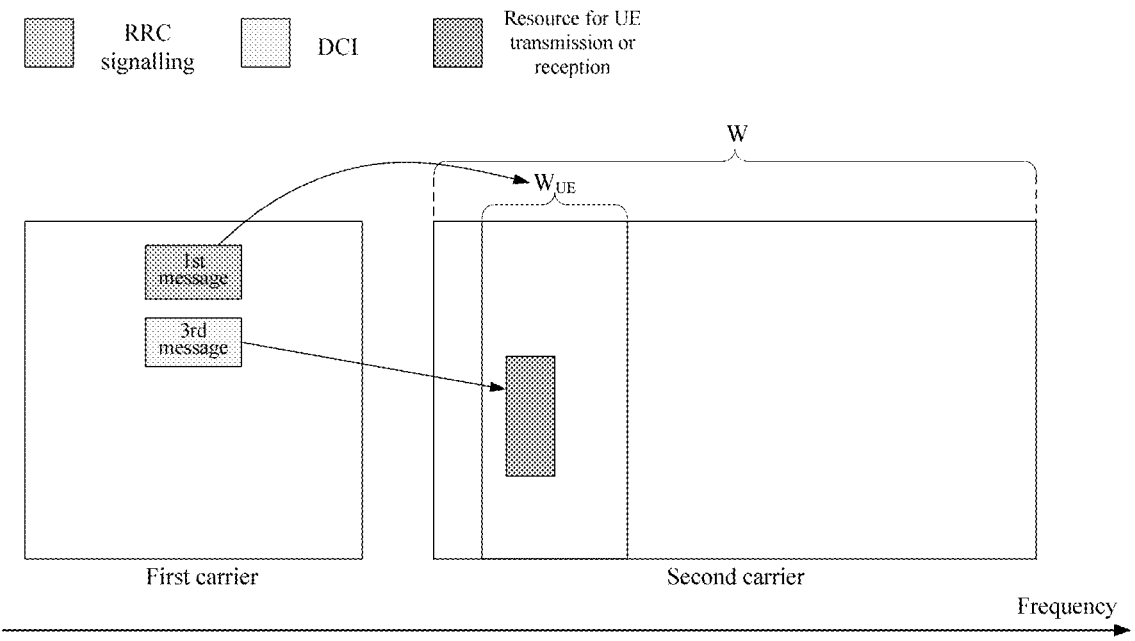
FIG. 4 illustrates a resource schematic view of resource determining scheme 1 with third message from first carrier according to some embodiments of the disclosure.

In order to better understand the features and technical contents of the embodiments of the disclosure, the implementations of embodiments of the disclosure will be illustrated in details in connection with the drawings. The drawings are provided merely for reference but not to limit the embodiments of the disclosure.

FIG. 1 illustrates a flow chart of a method for determining resources according to some embodiments of the disclosure. As illustrated in FIG. 1, the method for determining resources includes operations illustrated in blocks. The operations may begin from block 101.

At block 101, a UE receives a first message over a first cell. Here, the first message is used for determining M first bandwidth parts (BWPs) in a second cell, M is an integer greater than or equal to 1, each of the M first BWPs is smaller than or equal to a bandwidth of the second cell; and one or more transmission resources for the UE in the second cell is within at least one of the M first BWPs.

In the embodiments of the disclosure, the UE may be a mobile phone, a laptop, a notebook computer, a desktop computer or any device that can communicate with a network device.

In the embodiments of the disclosure, the UE may receive the first message from the network device over a first cell. Here, the network device may be a base station, e.g., a gNB in the 5G NR system.

In an implementation, the bandwidth of the second cell may be a system bandwidth.

In the embodiments of the disclosure, transmission resources in the first cell may be implemented by the first carrier, and transmission resources in the second cell may be implemented by the second carrier. In an implementation, the first cell (i.e., the first carrier) may be a main cell (i.e., a main carrier), and the second cell (i.e., the second carrier) may be an auxiliary cell (i.e., an auxiliary carrier). The UE may transmit signals in a carrier aggregation manner by using the first and/or second cells.

In the embodiments of the disclosure, the UE may determine the M first BWPs in the second cell based on the first message in the first cell, so as to transmit signals by utilizing one or more transmission resources within at least one of the M first BWPs.

In the embodiments of the disclosure, the UE may determine the M first BWPs in the second cell in the following ways.

Scheme 1: the M first BWPs are indicated by the first message, and the UE determines the M first BWPs based on the first message.

For example, 3 first BWPs, i.e., BWP1, BWP2, and BWP3 are indicated by the first message, and the UE determines BWP1, BWP2, and BWP3 based on the first message.

Scheme 2: N second BWPs are indicated by the first message, N is an integer greater than M, each of the N second BWPs is smaller than or equal to the bandwidth of the second cell, and the UE receives a second message over the first or second cell, wherein the second message indicates the M first BWPs among the N second BWPs.

For example, six second BWPs, i.e., BWP1, BWP2, BWP3, BWP4, BWP5, and BWP6 are indicated by the first message, the second message is used to indicate three BWPs, i.e., BWP1, BWP2, and BWP3 among the six BWPs. The UE determines BWP1, BWP2, and BWP3 based on the first message and the second message.

In an implementation, the first message may be conveyed by RRC signaling or system information (SI).

In an implementation, the second message may be conveyed by downlink control information (DCI) or a media access control control element (MAC CE).

In an implementation, the first message may further contain information about configuration in the first BWPs, wherein the information about configuration in the first BWPs contains at least one of the following: subcarrier spacing (SCS); bandwidth size; frequency-domain position; time-domain structure; configurations of synchronization signal; broadcast channel; system information; or reference signal.

It is to be understood that if M=1, the first message contains information about configuration in one first BWP; if M≥2, the first message contains information about configuration in all first BWPs. In this way, the UE can determine information about configuration in the first BWPs based on the first message and perform signal transmission over the transmission resources within the first BWPs based on the information about configuration in the first BWPs.

In an implementation, the UE receives a third message over the first or second cell, where the third message indicates the one or more transmission resources for the UE within the first BWPs of the second cell. Here, the transmission resources for the UE are time-domain resources and/or frequency-domain resources for the UE, and the UE performs signal transmission within the indicated transmission resources.

In an implementation, the third message may be conveyed by the DCI or the MAC CE.

In some embodiments of the disclosure, the first message may be transmitted over the first cell, the second message may be transmitted over the first or second cell, and the third message may be transmitted over the first or second cell.

In an implementation, if the second message is transmitted over the second cell, the second message is transmitted by using the transmission resources within the first BWPs.

In an implementation, if the third message is transmitted over the second cell, the third message is transmitted by using the transmission resources within the first BWPs.

FIG. 2 illustrates a flow chart of another method for determining resources according to some embodiments of the disclosure. As illustrated in FIG. 2, the method for determining resources includes operations illustrated in blocks. The operations may begin from block 201.

At block 201, a network device transmits a first message over a first cell. Here, the first message is used for determining M first bandwidth parts (BWPs) in a second cell, M is an integer greater than or equal to 1, each of the M first BWPs is smaller than or equal to a bandwidth of the second cell; and one or more transmission resources for the UE in the second cell is within at least one of the M first BWPs.

In the embodiments of the disclosure, the UE may determine the M first BWPs in the second cell in the following ways.

Scheme 1: the M first BWPs are indicated by the first message.

In this scheme, the UE determines the M first BWPs within the second cell based on the first message.

Scheme 2: N second BWPs are indicated by the first message, N is an integer greater than M, each of the N second BWPs is smaller than or equal to the bandwidth of the second cell, and the network device transmits a second message to the UE over the first or second cell, where the second message indicates the M first BWPs among the N second BWPs.

In this scheme, the UE determines the M first BWPs within the second cell based on the first message and the second message.

In an implementation, the first message may be conveyed by RRC signaling or system information (SI).

In an implementation, the second message may be conveyed by downlink control information (DCI) or a media access control control element (MAC CE).

In an implementation, the first message may further contain information about configuration in the first BWPs, wherein the information about configuration in the first BWPs contains at least one of the following: subcarrier spacing (SCS); bandwidth size; frequency-domain position; time-domain structure; configurations of synchronization signal; broadcast channel; system information; or reference signal.

In an implementation, the network device transmits a third message over the first or second cell, where the third message indicates the one or more transmission resources for the UE within the first BWPs of the second cell.

In an implementation, the third message may be conveyed by the DCI or the MAC CE.

In some embodiments of the disclosure, the bandwidth of the second cell is the system bandwidth.

Hereinafter, specific examples are given to further describe the embodiments of the disclosure in detail. In the following examples, $W_{UE}$ indicates the first BWP, candidate bands or candidates represents the second BWP, first carrier indicates the first cell, and second carrier indicates the second cell.

Example 1: Scheme 1 with Third Message from Second Carrier

As illustrated in FIG. 3, a UE receives information about one or multiple WUE (taking one WUE for example in FIG. 3) including its/their corresponding configurations indicated by the first message (e.g. in a RRC signaling) from the first carrier. The UE receives information about the detailed resource allocation within WUE indicated by the third message (e.g. in a DCI) from the second carrier.

Example 2: Scheme 1 with Third Message from First Carrier

As illustrated in FIG. 4, a UE receives information about one or multiple WUE (taking one WUE for example in FIG. 4) including its/their corresponding configurations indicated by the first message (e.g. in a RRC signaling) from the first carrier. The UE receives information about the detailed resource allocation within WUE indicated by the third message (e.g. in a DCI) from the first carrier.

Example 3: Scheme 2 with Second and Third Messages Both from Second Carrier

Figure 5:
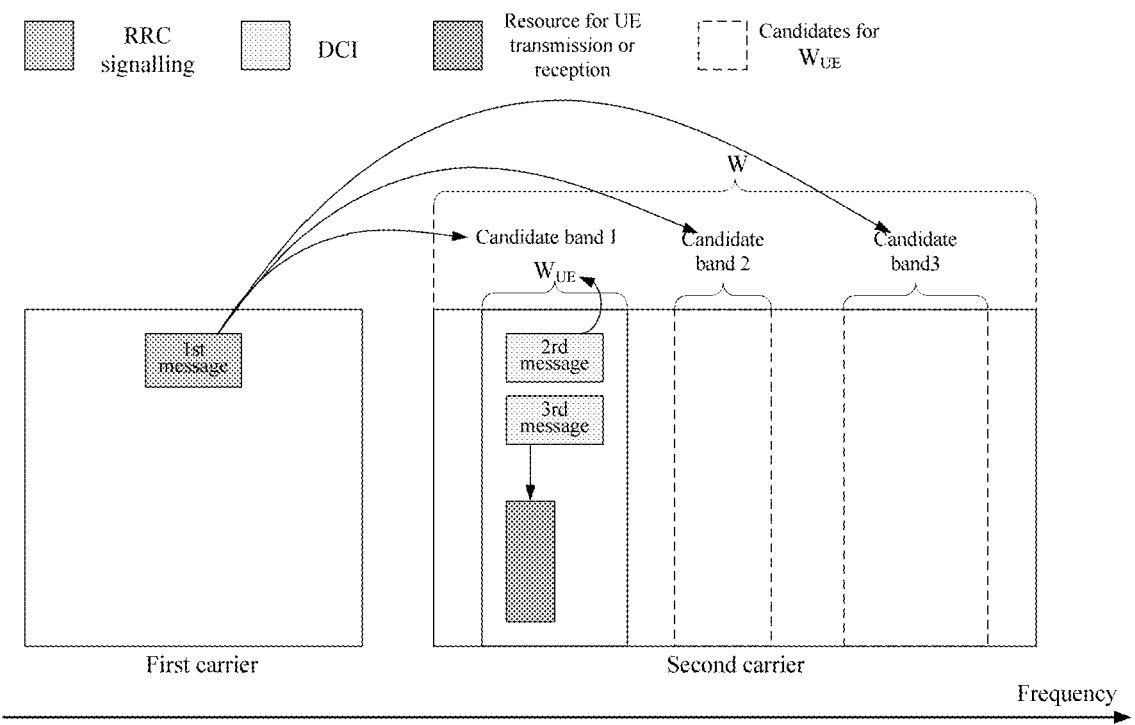
FIG. 5 illustrates a resource schematic view of resource determining scheme 2 with second and third messages both from second carrier according to some embodiments of the disclosure.

As illustrated in FIG. 5, a UE receives information about multiple WUE candidates including their corresponding configurations indicated by the first message (e.g. in a RRC signaling) from the first carrier. Then the UE receives the second message over the second carrier indicating the specific selected WUE from the candidates of (candidate band 1 is selected for WUE in example in FIG. 5). The UE receives information about the detailed resource allocation within WUE indicated by the third message (e.g. in a DCI) also from the second carrier.

Figure 6:
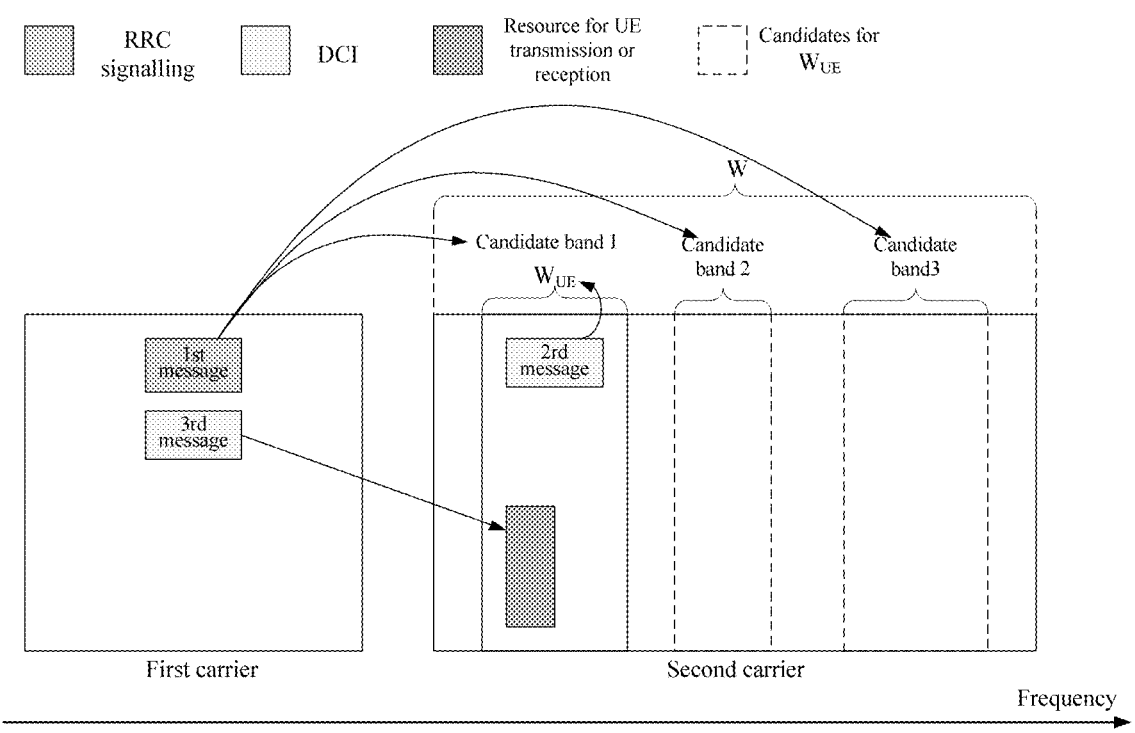
FIG. 6 illustrates a resource schematic view of resource determining scheme 2 with second message from second carrier and third message from first carrier according to some embodiments of the disclosure.

Example 4: Scheme 2 with Second Message from Second Carrier and Third Message from First Carrier As illustrated in FIG. 6, a UE receives information about multiple WUE candidates including their corresponding configurations indicated by the first message (e.g. in a RRC signaling) from the first carrier. Then the UE receives the second message from the second carrier indicating the specific selected WUE from the candidates of (candidate band 1 is selected for WUE in example in FIG. 6). The UE receives information about the detailed resource allocation within WUE indicated by the third message (e.g. in a DCI) from the first carrier.

Figure 7:
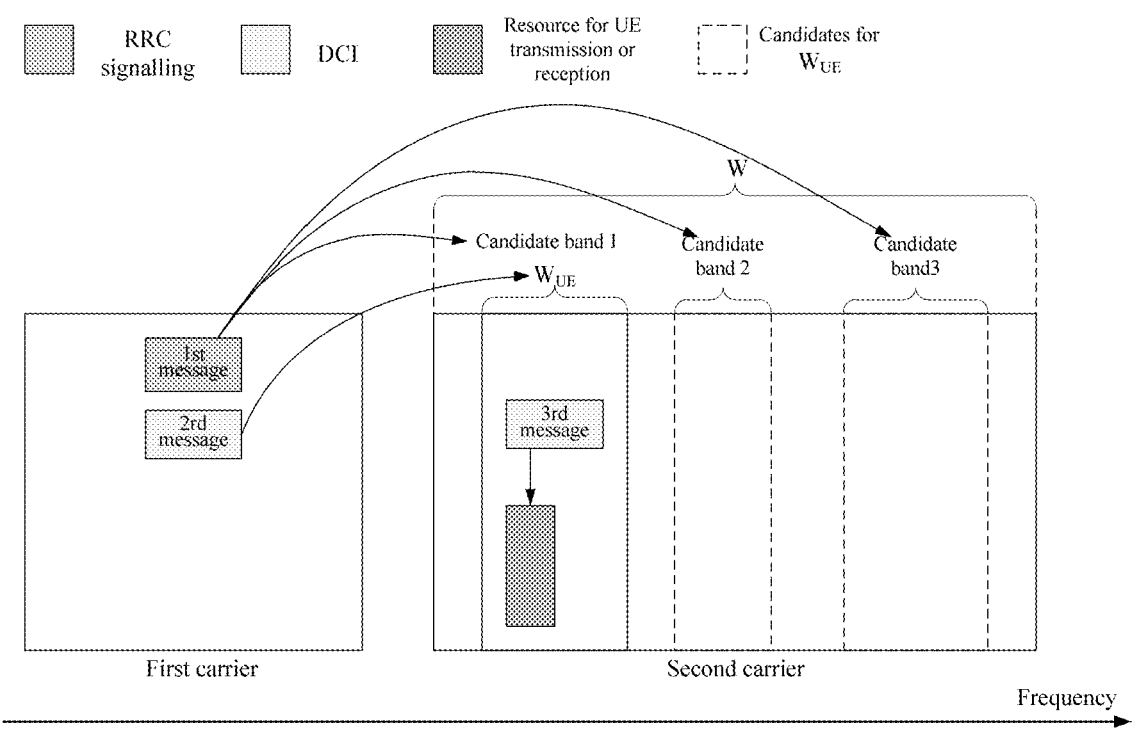
FIG. 7 illustrates a resource schematic view of resource determining Scheme 2 with second message from first carrier and third message from second carrier according to some embodiments of the disclosure.

Example 5: Scheme 2 with Second Message from First Carrier and Third Message from Second Carrier As illustrated in FIG. 7, a UE receives information about multiple WUE candidates including their corresponding configurations indicated by the first message (e.g. in a RRC signaling) from the first carrier. Then the UE receives the second message from the first carrier indicating the specific selected WUE from the candidates of (candidate band 1 is selected for WUE in example in FIG. 7). The UE receives information about the detailed resource allocation within WUE indicated by the third message (e.g. in a DCI) from the second carrier.

Example 6: Scheme 2 with Second and Third Messages Both from First Carrier

Figure 8:
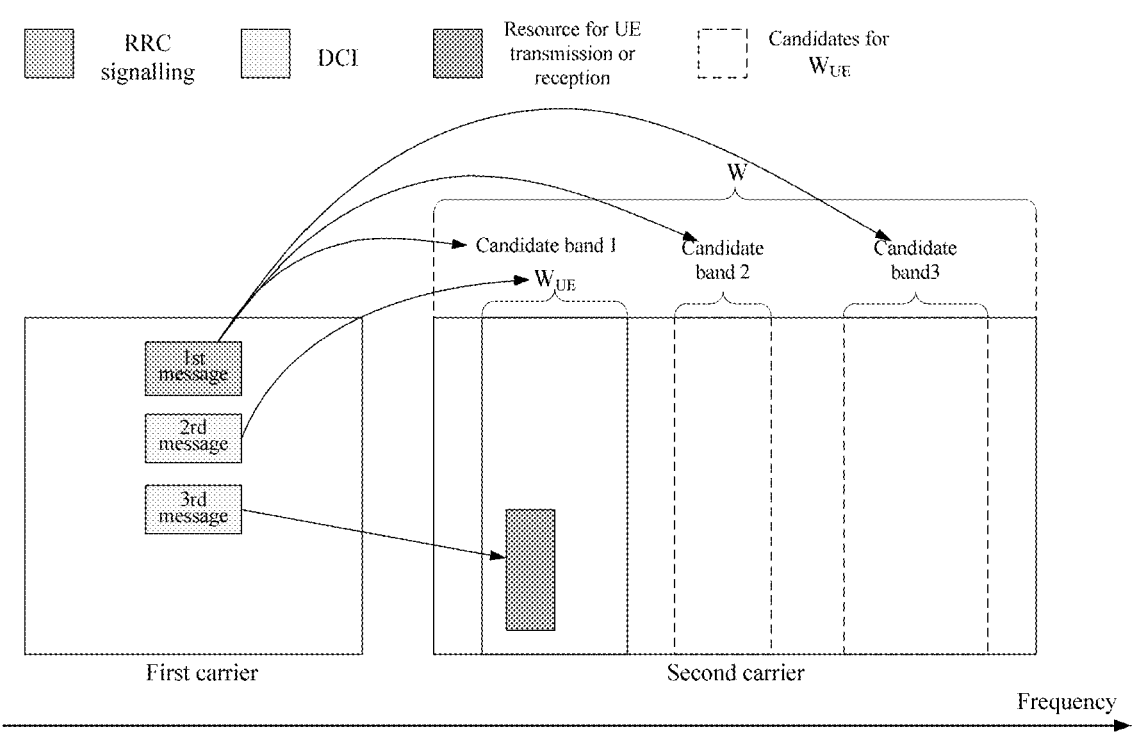
FIG. 8 illustrates a resource schematic view of resource determining Scheme 2 with second and third messages both from first carrier according to some embodiments of the disclosure.

As illustrated in FIG. 8, a UE receives information about multiple WUE candidates including their corresponding configurations indicated by the first message (e.g. in a RRC signaling) from the first carrier. Then the UE receives the second message from the first carrier indicating the specific selected WUE from the candidates of (candidate band 1 is selected for WUE in example in FIG. 8). The UE receives information about the detailed resource allocation within WUE indicated by the third message (e.g. in a DCI) from the first carrier.

Figure 9:
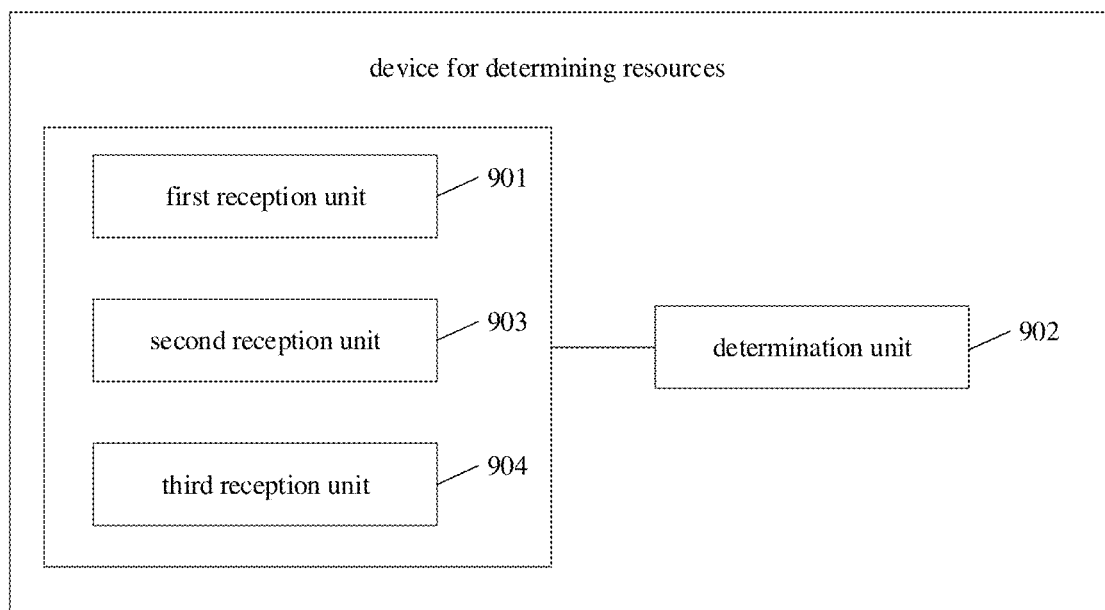
FIG. 9 illustrates a block diagram of a device for determining resources according to some embodiments of the disclosure.

FIG. 9 illustrates a block diagram of a device for determining resources according to some embodiments of the disclosure. As illustrated in FIG. 9, the device for determining resources includes a first reception unit 901.

The first reception unit 901 is configured to receive a first message over a first cell, wherein the first message is used for determining M first bandwidth parts (BWPs) in a second cell, M is an integer greater than or equal to 1, each of the M first BWPs is smaller than or equal to a bandwidth of the second cell; one or more transmission resources for the UE in the second cell is within at least one of the M first BWPs.

In an implementation, the M first BWPs may be indicated by the first message, and the device may further include a determination unit 902, configured to determine the M first BWPs based on the first message.

In an implementation, N second BWPs may be indicated by the first message, N is an integer greater than M, each of the N second BWPs is smaller than or equal to the bandwidth of the second cell, and the device may further include a second reception unit 903 and a determination unit 902.

The second reception unit 903 may configured to receive a second message over the first or second cell, where the second message indicates the M first BWPs among the N second BWPs.

The determination unit 902 may be configured to determine the M first BWPs based on the first message and the second message.

In an implementation, the second message may be conveyed by downlink control information (DCI) or a media access control control element (MAC CE).

In an implementation, the first message may be conveyed by RRC signaling or system information (SI).

In an implementation, the first message may further contain information about configuration in the first BWPs, where the information about configuration in the first BWPs contains at least one of the following: subcarrier spacing (SCS); bandwidth size; frequency-domain position; time-domain structure; configurations of synchronization signal; broadcast channel; system information; or reference signal.

In an implementation, the device may further include a third reception unit 904, configured to receive a third message over the first or second cell, wherein the third message indicates the one or more transmission resources for the UE within the first BWPs of the second cell.

In an implementation, the third message may be conveyed by the DCI or the MAC CE.

In an implementation, the bandwidth of the second cell may be a system bandwidth.

As people of ordinary skill in the art may appreciate, functions of the units in the device for determining resources as illustrated in FIG. 9 can be understood based on the above relevant descriptions regarding the method for determining resources, and can be implemented by programs running a processor or by logical circuits. Alternatively, the first reception unit 901, the second reception unit 903 and the third reception unit 904 may be implemented by a receiver, and the determination unit 902 may be implemented by a processor.

Figure 10:
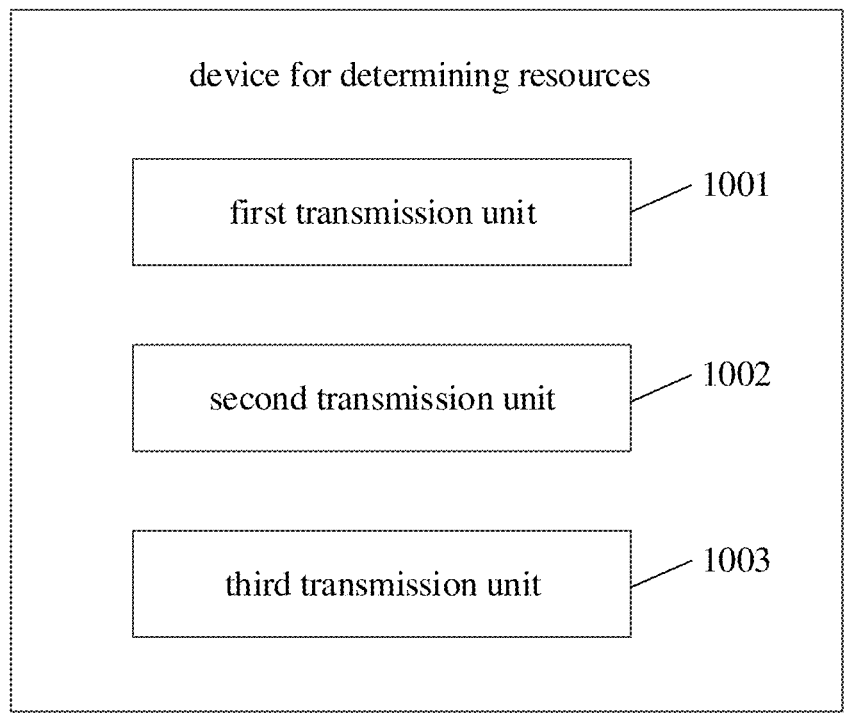
FIG. 10 illustrates a block diagram of another device for determining resources according to some embodiments of the disclosure.

FIG. 10 illustrates a block diagram of another device for determining resources according to some embodiments of the disclosure. As illustrated in FIG. 10, the device for determining resources includes a first transmission unit 1001.

The first transmission unit 1001 is configured to transmit a first message to a user equipment (UE) over a first cell. The first message is used for the UE to determine M first bandwidth parts (BWPs) in a second cell, M is an integer greater than or equal to 1, each of the M first BWPs is smaller than or equal to a bandwidth of the second cell. One or more transmission resources for the UE in the second cell is within at least one of the M first BWPs.

In an implementation, the M first BWPs may be indicated by the first message.

In an implementation, N second BWPs may be indicated by the first message, N is an integer greater than M, each of the N second BWPs is smaller than or equal to the bandwidth of the second cell, and the device may further include: a second transmission unit 1002, configured to transmit a second message to the UE over the first or second cell, wherein the second message indicates the M first BWPs among the N second BWPs.

In an implementation, the second message may be conveyed by downlink control information (DCI) or a media access control control element (MAC CE).

In an implementation, the first message may be conveyed by RRC signaling or system information (SI).

In an implementation, the first message may further contain information about configuration in the first BWPs, and the information about configuration in the first BWPs may contain at least one of the following: subcarrier spacing (SCS); bandwidth size; frequency-domain position; time-domain structure; configurations of synchronization signal; broadcast channel; system information; or reference signal.

In some embodiments of the disclosure, the device may further include a third transmission unit 1003, configured to transmit a third message to the UE over the first or second cell, wherein the third message indicates the one or more transmission resources for the UE within the first BWPs of the second cell.

In some embodiments of the disclosure, the third message may be conveyed by the DCI or the MAC CE.

In some embodiments of the disclosure, the bandwidth of the second cell may be a system bandwidth.

As people of ordinary skill in the art may appreciate, functions of the units in the device for determining resources as illustrated in FIG. 10 can be understood based on the above relevant descriptions regarding the method for determining resources, and can be implemented by programs running a processor or by logical circuits. Alternatively, the first transmission unit 1001, the second transmission unit 1002 and the third transmission unit 1003 may be implemented by a transmitter.

For the devices for determining resources as described above, when being implemented in form of software function unit and sold or used as an independent product, the function may also be stored in a computer-readable storage medium. Based on such an understanding, the technical solutions of the disclosure substantially or parts making contributions to the prior art or part of the technical solutions may be embodied in form of software product, and the computer software product is stored in a storage medium, including a plurality of instructions configured to enable a piece of computer equipment (which may be a personal computer, a server, a network device or the like) to execute all or part of the operations of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk. As such, the embodiments of the disclosure are not limited to any specific combination of software and hardware.

In some embodiments of the disclosure, a computer readable storage medium is provided, storing instructions, which, when executed by a processor, cause the processor to execute the above described method for determining resources.

Figure 11:
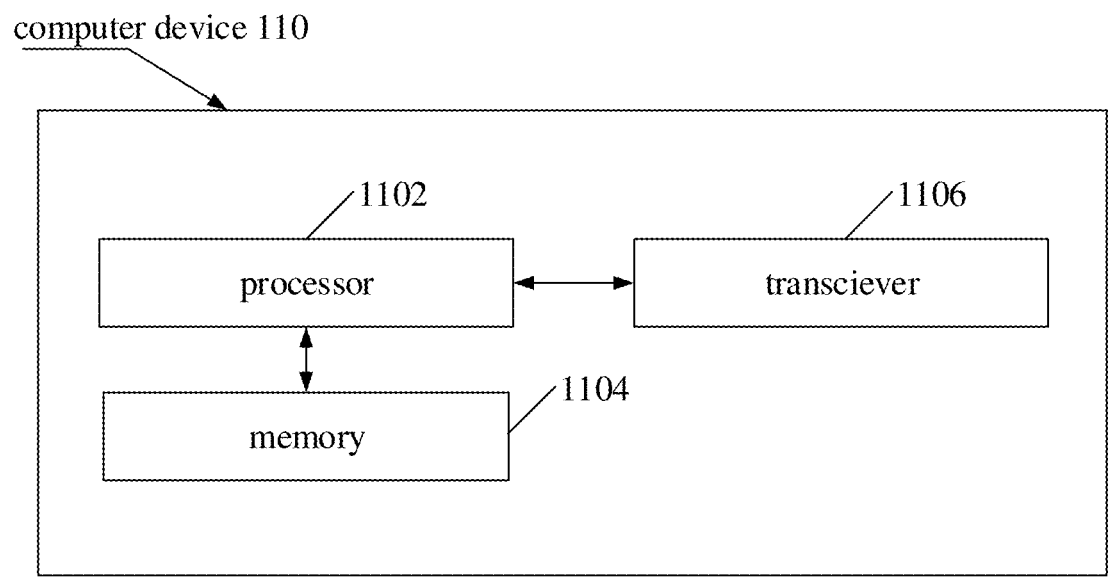
FIG. 11 illustrates a block diagram of a computer device according to some embodiments of the disclosure.

FIG. 11 illustrates a block diagram of a computer device according to some embodiments of the disclosure. The computer device may be a terminal, or may be a network device. As illustrated in FIG. 11, the computer device 110 may include one or more (only one is illustrated) processors 1102 (the processor 1102 may include, but is not limited to, a micro controller unit (MCU) or a programmable logic device (FPGA, Field Programmable Gate Array), etc.), a memory 1104 for storing data, and a transceiver 1106 for implementing a communication function. Persons of ordinary skill in the art should understand that the structure illustrated in FIG. 11 is merely illustrative, and does not limit the structure of the electronic device. For example, the computer device 110 may also include more or fewer components than illustrated in FIG. 11 or have a different configuration from that illustrated in FIG. 11.

The memory 1104 may be configured to store software programs and modules, such as the program instructions/modules corresponding to the methods in the embodiments of the disclosure. The processor 1102 executes various functional applications and data processing by running the software programs and modules stored in the memory 1104, that is, to implement the above methods. The memory 1104 may include high-speed random access memory, or may include non-volatile memory such as one or more magnetic storage devices, flash memory, or other non-volatile solid-state memories. In some examples, the memory 1104 may further include one or more memories remote to the processor 1102, and the memories may be connected to the computer device 110 over a network. Examples of such a network include, but are not limited to, the Internet, intranets, local area networks, mobile communication networks, and combinations thereof.

The transceiver 1106 is configured to receive or transmit data through a network. The network may include, for example, a wireless network provided a communication provider of the computer device 110. In an example, the transceiver 1106 includes a network interface controller (NIC) which can be connected to other network devices through a base station to implement communication with the Internet. In an example, the transceiver 1106 may be a radio frequency (RF) circuit which can implement communication with the Internet wirelessly.

The embodiments of the disclosure may be combined with each other freely without confliction.

In the embodiments of the disclosure, a UE receives a first message over a first cell, wherein the first message is used for determining M first BWPs in a second cell, M is an integer greater than or equal to 1, each of the M first BWPs is smaller than or equal to a bandwidth of the second cell, where one or more transmission resources for the UE in the second cell is within at least one of the M first BWPs. Herein, a cell may represent a carrier. This innovation designed a new approach to configure from the one carrier the bandwidth part of another carrier. With the new approach, the problem is solved and the deficiency is improved as below:

1) By cross-carrier configuration of a bandwidth part, resource for a UE in a second carrier can be allocated over the bandwidth part with a much smaller size. It can significantly reduce the complexity and signaling overhead for resource allocation. Hence it enables a UE to perform an efficient carrier aggregation operation in an ultra-wideband system e.g. 5G.

2) Furthermore, it also supports dynamic selection of bandwidth part by the second carrier from a set of candidates pre-configured by the first carrier. This keeps the flexibility of bandwidth part configuration in case no perfect backhauling supporting dynamic signaling exchange exists between the two carriers.

In the several embodiments provided in the application, it shall be understood that the disclosed systems, devices and methods may be realized in other modes. For example, the embodiments of the above-described devices are only exemplary, for example, the division of the units is only a logic function division, other division modes may be adopted in practice, e.g., multiple units or components may be combined or integrated in another system, or some characteristics may be omitted or be not executed. From another point of view, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is, the components may be positioned at one place or may be distributed on multiple network units. The objective of the solution of the embodiments may be fulfilled by selecting part of or all of the units according to actual needs.

In addition, in various embodiments of the disclosure, the functional units may be integrated in one processing unit, or the functional units may separately and physically exist, or two or more units may be integrated in one unit. The integrated units may be implemented by hardware or by hardware plus software functional units.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

What is claimed is:

1. A method for determining resources, comprising:
transmitting, by a network device, a first message to a user equipment (UE) over a first cell, wherein the first message is used for the UE to determine a first bandwidth part (BWP) in a second cell, the first BWP is smaller than or equal to a bandwidth of the second cell, wherein one or more transmission resources for the UE in the second cell is within the first BWP, wherein N second BWPs are indicated by the first message, N is an integer greater than 1, each of the N second BWPs is smaller than or equal to the bandwidth of the second cell;
transmitting, by the network device, a third message over the first or second cell, wherein the third message indicates the one or more transmission resources for the UE within the first BWPs of the second cell; and
transmitting, by the network device, a second message to the UE over the first or second cell, wherein the second message indicates the first BWP among the N second BWPs.

2. The method according to claim 1, wherein the second message is conveyed by downlink control information (DCI) or a media access control (MAC) control element.

3. The method according to claim 1, wherein the first message is conveyed by RRC signaling or system information (SI).

4. The method according to claim 1, wherein the first message further contains information about configuration in the first BWPs, wherein the information about configuration in the first BWPs contains at least one of the following:
subcarrier spacing (SCS); bandwidth size; frequency-domain position; time-domain structure; configurations of synchronization signal; broadcast channel; system information; or
reference signal.

5. The method according to claim 1, wherein the third message is conveyed by downlink control information (DCI) or a media access control (MAC) control element (CE).

6. The method according to claim 1, wherein the bandwidth of the second cell is a system bandwidth.

7. A device for determining resources, comprising: a processor and a transceiver,
wherein the transceiver is configured to transmit a first message to a user equipment (UE) over a first cell, wherein the first message is used for the UE to determine a first bandwidth part (BWP) in a second cell, the first BWP is smaller than or equal to a bandwidth of the second cell, wherein one or more transmission resources for the UE in the second cell is within the first BWP, wherein N second BWPs are indicated by the first message, N is an integer greater than 1, each of the N second BWPs is smaller than or equal to the bandwidth of the second cell;
wherein the transceiver is further configured to transmit a third message over the first or second cell, wherein the third message indicates the one or more transmission resources for the UE within the first BWPs of the second cell;
wherein the transceiver is further configured to transmit a second message to the UE over the first or second cell, wherein the second message indicates the first BWP among the N second BWPs.

8. The device according to claim 7, wherein the second message is conveyed by downlink control information (DCI) or a media access control (MAC) control element (CE).

9. The device according to claim 7, wherein the first message is conveyed by RRC signaling or system information (SI).

10. The device according to claim 7, wherein the first message further contains information about configuration in the first BWPs, wherein the information about configuration in the first BWPs contains at least one of the following:
subcarrier spacing (SCS); bandwidth size; frequency-domain position; time-domain structure; configurations of synchronization signal; broadcast channel; system information; or reference signal.

11. The device according to claim 7, wherein the third message is conveyed by downlink control information (DCI) or a media access control (MAC) control element (CE).

12. The device according to claim 7, wherein the bandwidth of the second cell is a system bandwidth.

13. A non-transitory computer-readable storage medium, storing computer executable instructions, which, when executed by a processor of a device, cause the device to implement the method according to claim 1.

* * * * *